(12) United States Patent
Andreasson et al.

(10) Patent No.: US 8,270,960 B2
(45) Date of Patent: Sep. 18, 2012

(54) CONNECTING MOBILE TERMINALS BASED ON SENSOR DATA

(75) Inventors: Mans Folke Markus Andreasson, Lund (SE); Per Emil Astrand, Lund (SE); Erik Johan Vendel Backlund, Gantofta (SE)

(73) Assignee: Sony Mobile Communications AB, Lund (SE)

( * ) Notice: Subject to any disclaimer, the term of this patent is extended or adjusted under 35 U.S.C. 154(b) by 1054 days.

(21) Appl. No.: 12/104,731

(22) Filed: Apr. 17, 2008

(65) Prior Publication Data

US 2009/0264150 A1    Oct. 22, 2009

(51) Int. Cl.
*H04M 3/00* (2006.01)
(52) U.S. Cl. ........... 455/418; 455/550.1; 455/422.1; 340/531
(58) Field of Classification Search ............ 455/418, 455/550.1, 422.1; 370/328; 709/223; 340/531
See application file for complete search history.

(56) References Cited

U.S. PATENT DOCUMENTS

| | | | |
|---|---|---|---|
| 6,674,995 B1 * | 1/2004 | Meyers et al. | 455/41.2 |
| 2002/0111173 A1 | 8/2002 | Hendrey et al. | |
| 2006/0212561 A1 * | 9/2006 | Feng | 709/223 |
| 2006/0234635 A1 | 10/2006 | Riordan et al. | |
| 2007/0124721 A1 | 5/2007 | Cowing et al. | |
| 2007/0210916 A1 * | 9/2007 | Ogushi et al. | 340/531 |
| 2007/0262861 A1 * | 11/2007 | Anderson et al. | 340/539.13 |
| 2008/0002667 A1 * | 1/2008 | Smith et al. | 370/352 |
| 2008/0294752 A1 * | 11/2008 | Deschamps | 709/219 |

OTHER PUBLICATIONS

Patent Cooperation Treaty International Search Report and Written Opinion of the International Searching Authority corresponding to PCT/IB2008/054283 dated Jul. 28, 2009, 17 pages.

* cited by examiner

*Primary Examiner* — Danh Le
(74) *Attorney, Agent, or Firm* — Patrick B. Horne; Moore & Van Allen

(57) ABSTRACT

A method performed by a mobile terminal may include receiving sensor data from a plurality of sensors on a mobile terminal, determining when the received sensor data satisfies a rule, transmitting information from the mobile terminal to a network device, where the information includes at least one of an application identifier, a rule or some of the received sensor data, and connecting the mobile terminal to another mobile terminal, where the another mobile terminal is selected by the network device based on the transmitted information from the mobile terminal.

20 Claims, 10 Drawing Sheets

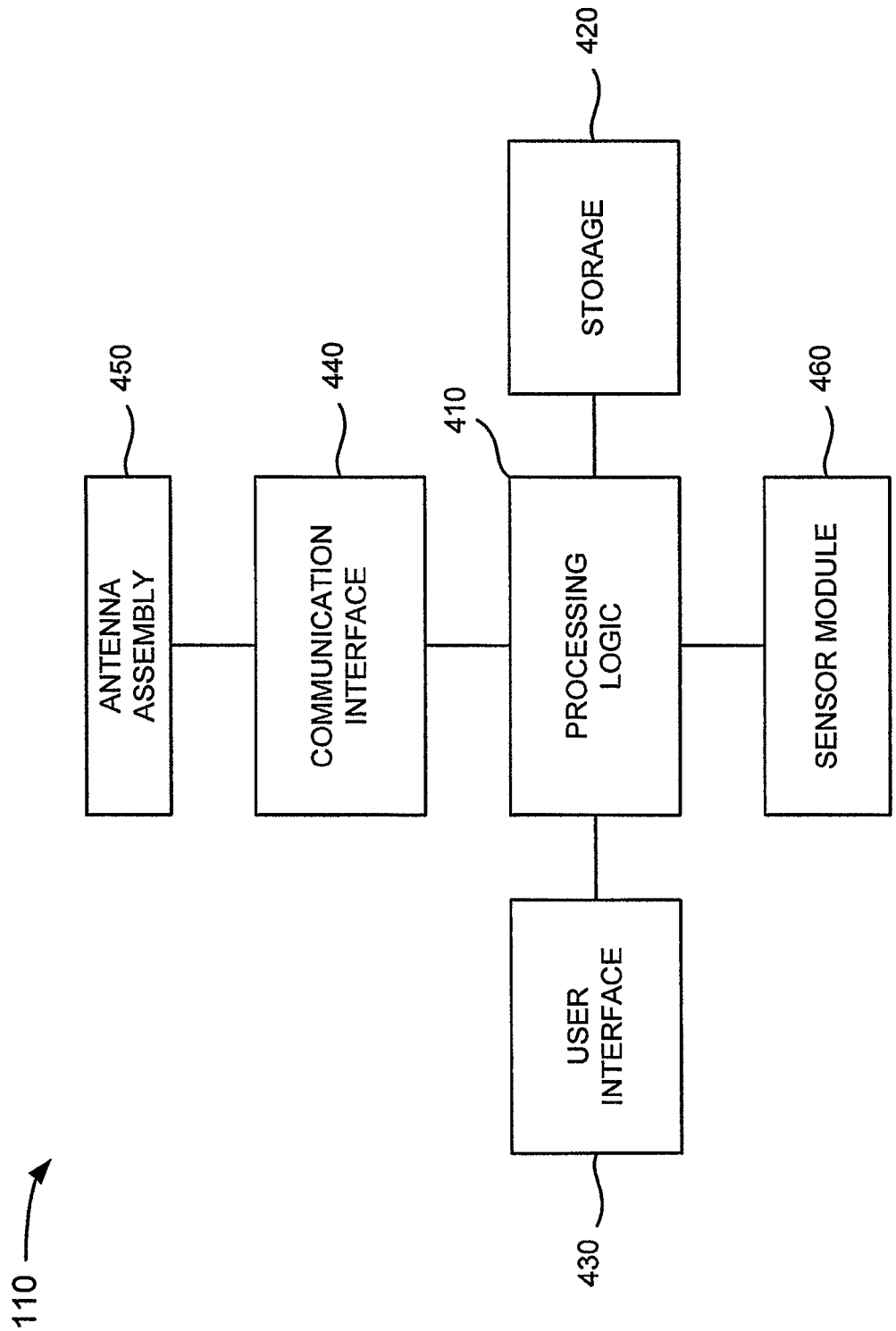

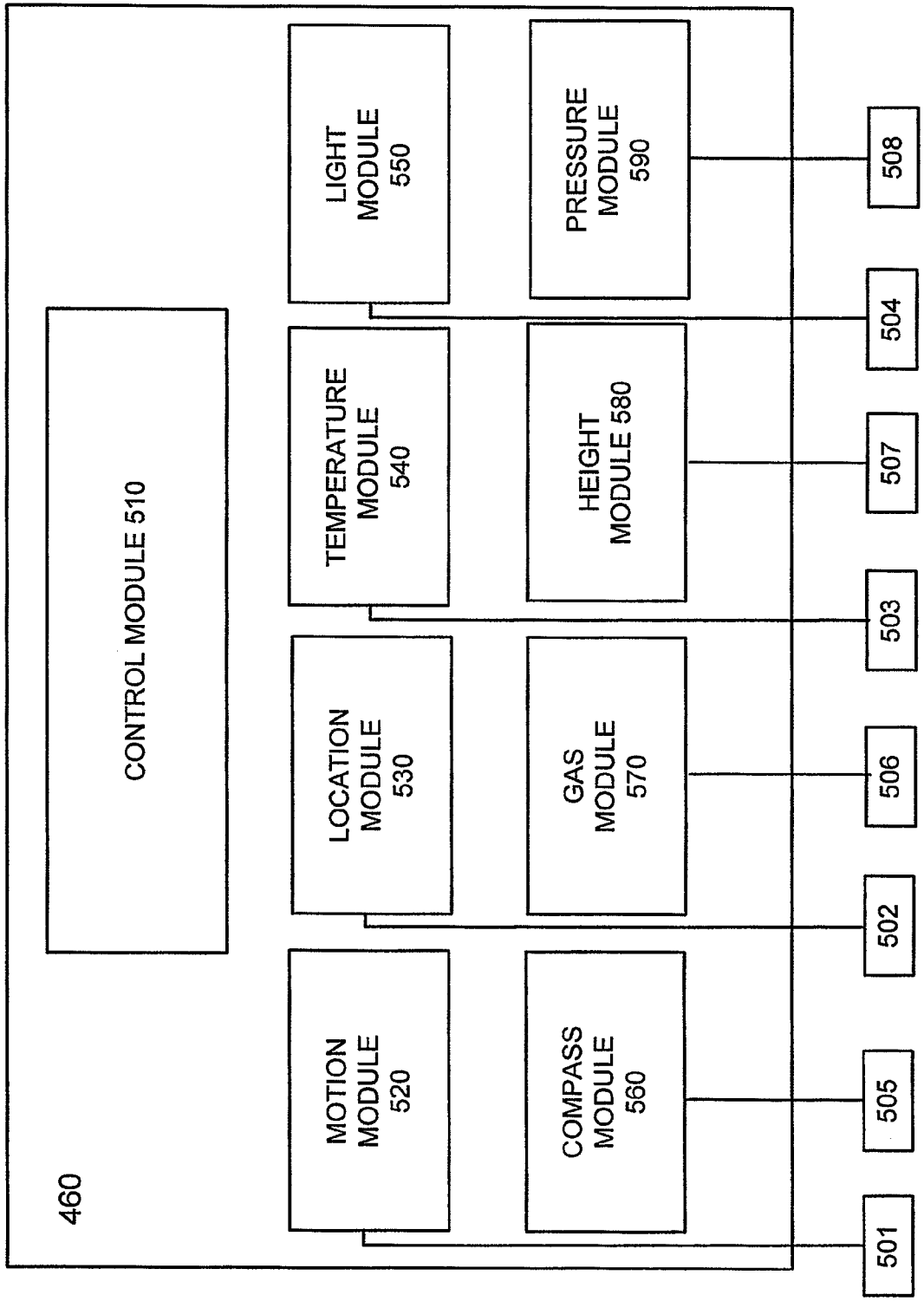

| DEVICE ID | APPLICATION | DATA | RULE |
|---|---|---|---|
| 137 | motion | V = 0 | V < 1 km/hr |
| 216 | motion | V = 0 | V < 1 km/hr |
| 144 | motion | V = 0.5 | V < 1 km/hr |
| | | | |
| | | | |
| | | | |
| | | | |
| | | | |
| | | | |
| | | | |
| | | | |
| | | | |
| | | | |
| | | | |

FIG. 6A

| DEVICE ID | APPLICATIONS | DATA | RULES |
|---|---|---|---|
| 137 | location | L = (x,y) | L(x,y) within 1km of L(a,b) |
|  | motion | V = 0 | V < 1 km/hr |
| 216 | location | L = (x,y) | L (x,y) within 1km of L(a,b) |
|  | motion | V = 0 | V < 1 km/hr |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |
|  |  |  |  |

FIG. 6B

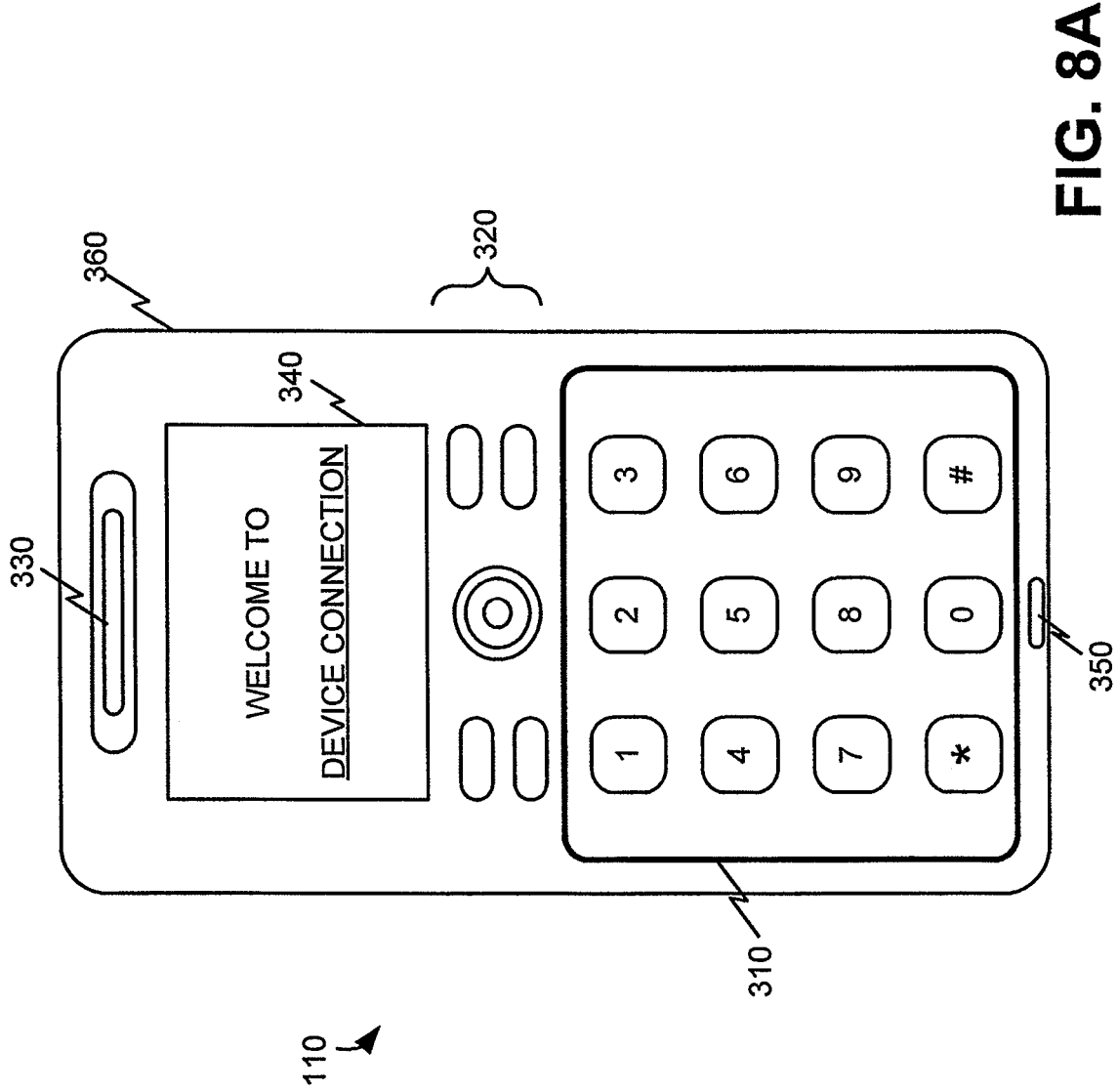

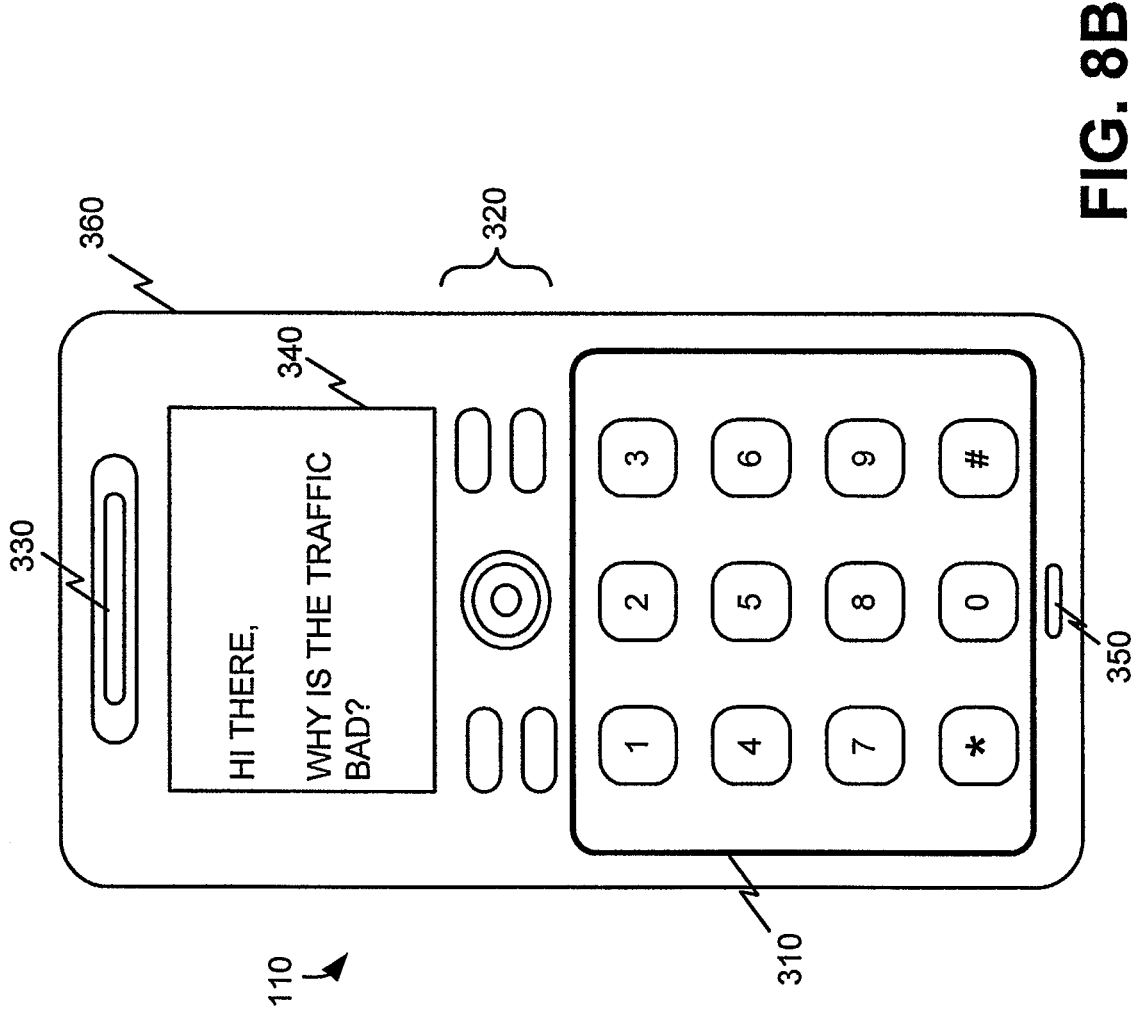

CONNECTING MOBILE TERMINALS BASED ON SENSOR DATA

DESCRIPTION OF RELATED ART

Communication devices, such as cellular telephones, have become increasingly versatile. For example, cellular telephones may often include different types of sensors and may include Global Positioning System (GPS) tracking features. At the present time, the sensors and GPS features employed on cellular telephones and portable communications devices are limited to sensing parameters and/or tracking a position of the device itself.

SUMMARY

According to one aspect, a method may comprise receiving sensor data from a plurality of sensors on a mobile terminal; determining when the received sensor data satisfies at least one rule; transmitting information from the mobile terminal to a network device, where the information includes at least one of an application identifier, a rule or some of the received sensor data; and connecting the mobile terminal to another mobile terminal, where the another mobile terminal is selected by the network device based on the transmitted information from the mobile terminal.

Additionally, the plurality of sensors may provide signals to measure a plurality of different parameters.

Additionally, the each of the plurality of different parameters may be associated with an application and a rule.

Additionally, the plurality of different parameters may include a position parameter and a motion parameter.

Additionally, the connecting the mobile terminal to another mobile terminal comprises establishing an Internet Protocol (IP) connection.

According to another aspect, a mobile terminal is provided. The mobile terminal may comprise: a plurality of sensors to receive sensor data to measure a plurality of parameters; a memory for storing at least one rule associated with each of the plurality of parameters; and logic configured to: compare the received sensor data to the stored rules associated with each of the plurality of parameters, determine when a rule is satisfied, transmit information identifying the satisfied rule to a network device, and receive information via an Internet Protocol (IP) connection, where the IP connection is established based on the transmitted information.

Additionally, the logic may be further configured to transmit the sensor data that satisfied the rule to the network device.

Additionally, the memory may store an application associated with each of the plurality of parameters, where the logic may be further configured to transmit an application identifier associated with the satisfied rule to the network device.

Additionally, the received information via an (IP) connection comprises an alert from the network device.

Additionally, the received information via an (IP) connection comprises text from another mobile terminal.

According to another aspect, a network device is provided. The network device may comprise an interface for receiving sensor data and rule-related information from a plurality of mobile terminals; a memory for storing the received sensor data and rule related information from the plurality of mobile terminals; and logic configured to: access the memory to identify mobile terminals that transmitted sensor data that satisfy a first rule, and generate an Internet Protocol (IP) connection between the identified mobile terminals.

Additionally, the logic may be further configured to access the memory to identify mobile terminals that transmitted sensor data that satisfy more than one rule.

Additionally, the memory may store a device ID associated with each mobile terminal.

Additionally, the memory may store an application identifier, rule related information and sensor data associated with each device ID.

Additionally, the logic may be further configured to assign an IP address to each of the identified mobile terminals to generate the (IP) connection between the identified mobile terminals.

According to another aspect, a method is provided. The method may comprise receiving information corresponding to satisfied rules from a plurality of mobile terminals; storing the received information in memory; identifying two or more mobile terminals that satisfy a same rule; and generating an Internet Protocol (IP)-based connection between the identified mobile terminals.

Additionally, the method may further comprise receiving information identifying each of the plurality of mobile terminals; and receiving application information and sensor data associated with the satisfied rules.

Additionally, the method may further comprise storing into memory the received information identifying each of the plurality of mobile terminals, the received application information and the sensor data associated with the satisfied rules.

Additionally, the method may further comprise identifying two or more mobile terminals that satisfy at least two of the same rules.

Additionally, the generating an IP-based connection between the identified mobile terminals may comprises transmitting a link to the identified mobile terminals.

Other features and advantages of the systems and methods described herein will become readily apparent to those skilled in this art from the following detailed description. The implementations shown and described provide illustration of the best mode contemplated for carrying out the embodiments. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

FIG. 4 is a diagram of an exemplary mobile terminal of FIG. 3;

FIG. 5 illustrates an exemplary sensor module of FIG. 4;

FIGS. 6A and 6B illustrate exemplary lists or tables in the server of FIG. 2;

FIGS. 8A and 8B illustrate exemplary displays on a mobile terminal.

DETAILED DESCRIPTION

The following detailed description refers to the accompanying drawings. The same reference numbers in different drawings identify the same or similar elements. Also, the following detailed description does not limit the systems and methods described herein. Instead, the scope of the systems and methods are defined by the appended claims and their equivalents.

Figure 1:
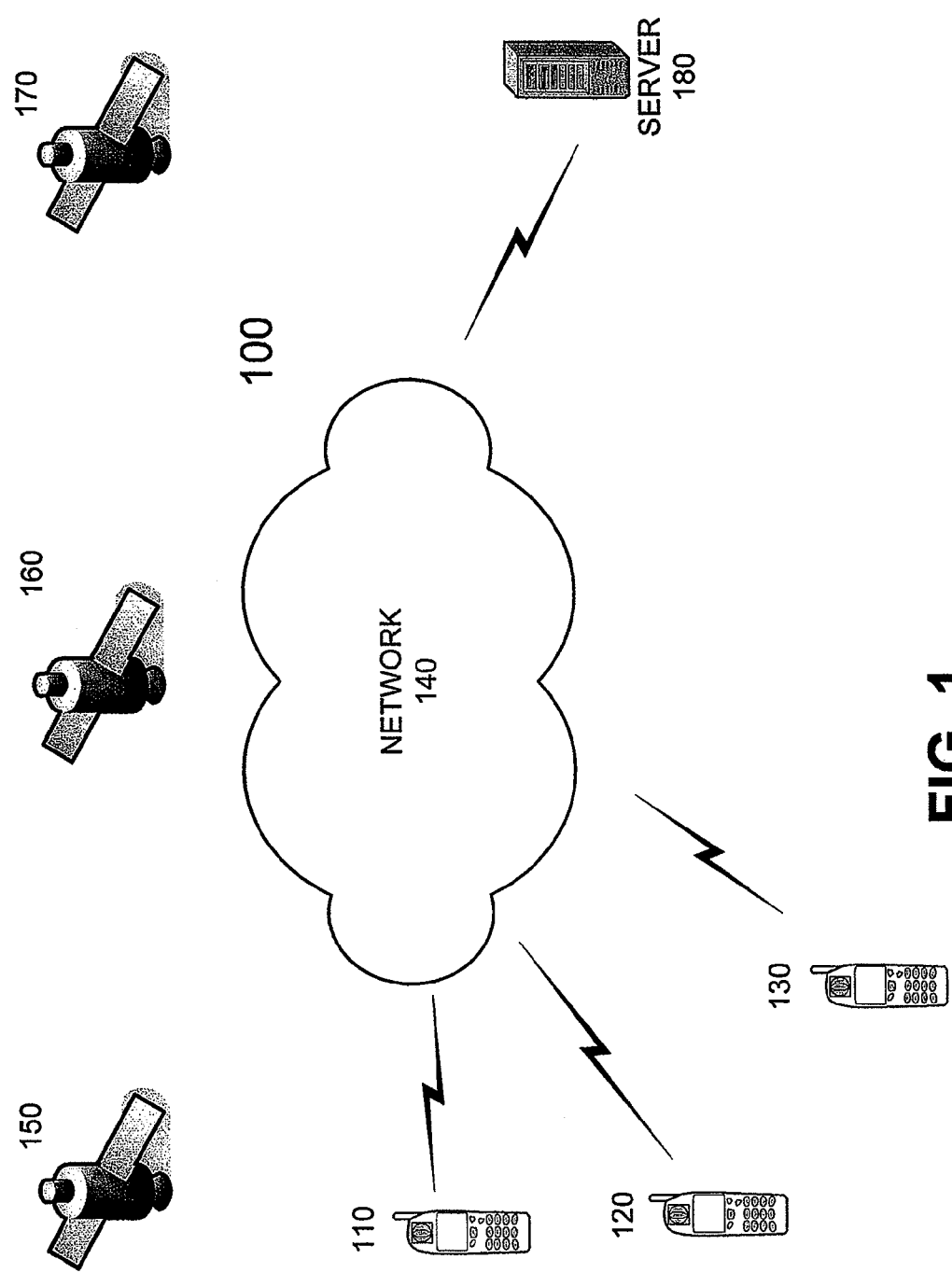
FIG. 1 is a diagram of an exemplary system in which methods and systems described herein may be implemented.

FIG. 1 is a diagram of an exemplary system 100 in which methods and systems described herein may be implemented. System 100 may include mobile terminals 110, 120 and 130, network 140, GPS satellites 150, 160 and 170, and server 180. It should be understood that system 100 may include other numbers of mobile terminals, GPS satellites and servers. System 100 may also include a number of base stations and base station antennas used to transmit information to/from mobile terminals 110-130 and other devices in system 100.

The methods and systems described herein may be implemented in the context of a mobile terminal such as one or more of mobile terminals 110, 120 or 130. As used herein, the term "mobile terminal" may include a cellular radiotelephone with a multi-line display; a Personal Communications System (PCS) terminal that may combine a cellular radiotelephone with data processing, facsimile and data communications capabilities; a personal digital assistant (PDA) that can include a radiotelephone, pager, Internet/Intranet access, Web browser, organizer, calendar and/or a global positioning system (GPS) receiver, a radio (AM/FM) receiver; and a laptop and/or palmtop receiver or other appliance that includes a radiotelephone transceiver. Mobile terminals may also be referred to as "pervasive computing" devices that are capable of communicating with other devices via Short Messaging Service (SMS) protocols or other protocols that allow for simultaneous communications of voice, data, music, video and other information.

Network 140 may include one or more networks including a cellular network, such as a Global System for Mobile communications (GSM) network, a satellite network, the Internet, a telephone network, such as the Public Switched Telephone Network (PSTN), a metropolitan area network (MAN), a wide area network (WAN), or a local area network (LAN). Mobile terminals 110, 120 and 130 may communicate with each other over network 140 via wired, wireless or optical connections.

In an exemplary implementation, network 140 includes a cellular network used for transmitting data and messages to/from mobile terminals 110-130. For example, components of a cellular network may include base station antennas (not shown) that transmit and receive data from mobile terminals within their vicinity. Other components of a cellular network, for example, may also include base stations (not shown) that connect to the base station antennas and communicate with other devices, such as switches and routers (not shown).

GPS satellites 150, 160 and 170 may include a communication interface that may include any transceiver-like mechanism and one or more processors or microprocessors enabled by software programs and/or hardware to perform functions, such as transmission of GPS signals. GPS signals transmitted by GPS satellites 150-170 may be received by mobile terminals 110-130, and may be used to calculate the position of mobile terminals 110-130, for example.

Server 180 may include one or more processors or microprocessors enabled by software programs to perform functions, such as data storage and transmission, and interfacing with other servers (not shown), mobile terminals 110-130 and network 140, for example. Server 180 may also include a data storage memory, such as a random access memory (RAM) or another dynamic storage device that stores information related to sensor data received from mobile terminals 110-130, as described below.

Figure 2:
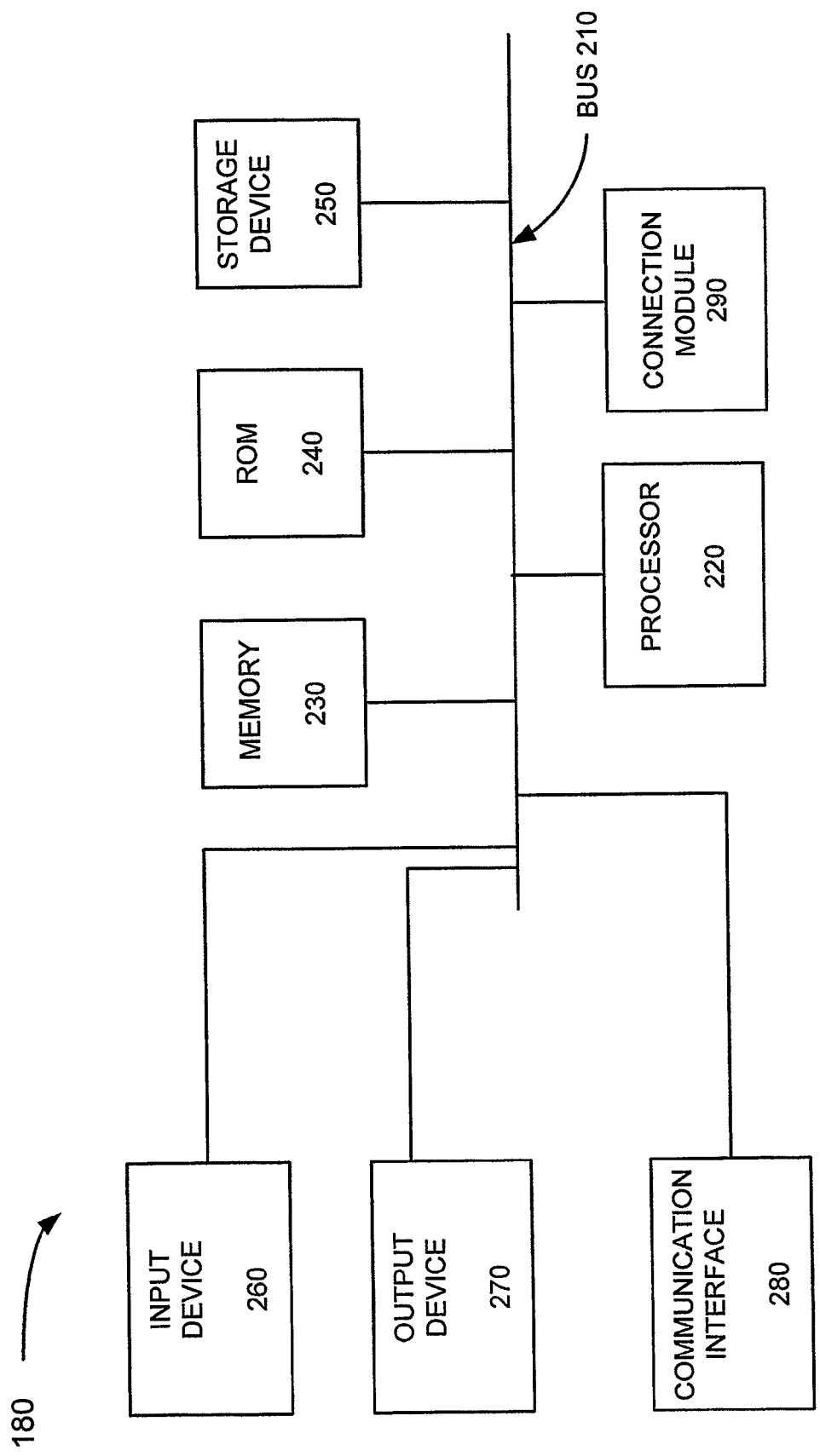
FIG. 2 is a diagram of an exemplary server of FIG. 1.

FIG. 2 is a diagram of an exemplary configuration of server 180. Server 180 may include bus 210, processor 220, a memory 230, a read only memory (ROM) 240, a storage device 250, an input device 260, an output device 270, a communication interface 280, and a connection module 290. Server 180 may also include one or more power supplies (not shown). Server 180 may also be configured in a number of other ways and may include other or different elements.

Bus 210 permits communication among the components of server 180. Processor 220 may include any type of processor, microprocessor, or processing logic that may interpret and execute instructions. Processor 220 may also include logic that is able to decode media files, such as audio files, video files, etc., and generate output to, for example, a speaker, a display, etc. Memory 230 may include a random access memory (RAM) or another dynamic storage device that stores information and instructions for execution by processor 220. Memory 230 may also be used to store temporary variables or other intermediate information during execution of instructions by processor 220.

ROM 240 may include a ROM device and/or another static storage device that stores static information and instructions for processor 220. Storage device 250 may include a magnetic disk or optical disk and its corresponding drive and/or some other type of magnetic or optical recording medium and its corresponding drive for storing information and instructions. Storage device 250 may also include a flash memory (e.g., an electrically erasable programmable read only memory (EEPROM)) device for storing information and instructions.

Input device 260 may include one or more mechanisms that permit a user to input information to server 180, such as a keyboard, a mouse, a microphone, a pen, voice recognition and/or biometric mechanisms, etc. Output device 270 may include one or more mechanisms that output information to the user, including a display, a printer, etc.

Communication interface 280 may include any transceiver-like mechanism that enables server 180 to communicate with other devices and/or systems. For example, communication interface 280 may include a modem or an Ethernet interface to a LAN. Communication interface 280 may include other mechanisms for communicating via a network, such as network 140. For example, communication interface 280 may include one or more radio frequency (RF) transmitters, and one or more RF receivers and antennas for transmitting and receiving RF signals.

Connection module 290 may include hardware and/or software for receiving information from mobile terminals 110-130 and for establishing connections between mobile terminals 110-130 based on the received information. For example, connection module 290 may store lists of sensor information received from mobile terminals 110-130 and may store and associate the received sensor information with information received from other of mobile terminals 110-130. Processor 220 and/or connection module 290 may perform processing for establishing Internet Protocol (IP) connections between mobile terminals 110-130 based on the received sensor information. For example, processor 220 and/or connection module 290 may receive signals relating to sensor data received from mobile terminals 110-130 and may compare the received sensor data to rules or conditions that determine when to establish IP connections between any of mobile terminals 110-130.

According to an exemplary implementation, server 180 may perform various processes in response to processor 220 executing sequences of instructions contained in memory 230. Such instructions may be read into memory 230 from another computer-readable medium, such as storage device 250, or from a separate device via communication interface 280. It should be understood that a computer-readable medium may include one or more memory devices. Execution of the sequences of instructions contained in memory 230 causes processor 220 to perform the acts that will be described hereafter. In alternative embodiments, hardwired circuitry may be used in place of or in combination with software instructions to implement aspects of the embodiments. Thus, the systems and methods described herein are not limited to any specific combination of hardware circuitry and software.

Figure 3:
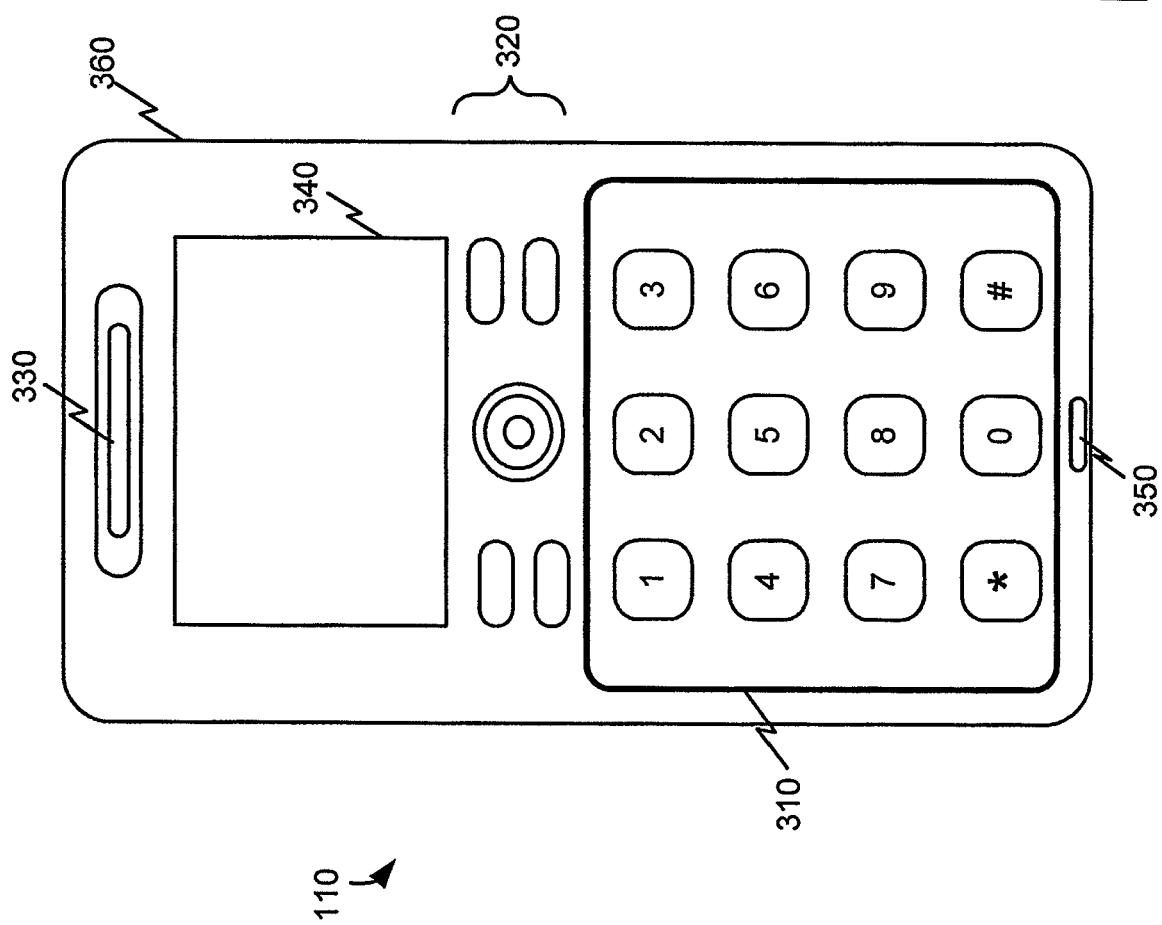
FIG. 3 shows an exemplary mobile terminal.

FIG. 3 shows an exemplary mobile terminal 110 that may include housing 360, keypad 310, control keys 320, speaker 330, display 340, and microphone 350. Mobile terminals 120 and 130 may be configured in a similar manner. Housing 360 may include a structure configured to hold devices and components used in mobile terminal 110. For example, housing 360 may be formed from plastic, metal, or composite and may be configured to support keypad 310, control keys 320, speaker 330, display 340 and microphone 350.

Keypad 310 may include devices and/or logic that can be used to operate mobile terminal 110. Keypad 310 may further be adapted to receive user inputs, directly or via other devices, such as a stylus for entering information into mobile terminal 110. In one implementation, communication functions of mobile terminal 110 may be controlled by activating keys in keypad 310. Implementations of keys may have key information associated therewith, such as numbers, letters, symbols, etc. The user may operate keys in keypad 310 to place calls, enter digits, commands, and text messages into mobile terminal 110. Designated functions of keys may form and/or manipulate images that may be displayed on display 340.

Control keys 320 may include buttons that permit a user to interact with mobile terminal 110 to perform specified actions, such as to interact with display 340, etc. For example, a user may use control keys 320 to select from a menu of choices that may include selecting a choice to send or receive text messages to another mobile terminal, such as mobile terminals 120-130.

Speaker 330 may include a device that provides audible information to a user of mobile terminal 110. Speaker 330 may be located anywhere on mobile terminal 110 and may function, for example, as an earpiece when a user communicates using mobile terminal 110. Speaker 330 may also function as an output device for a playing music, or generating an alarm tone in an emergency, for example.

Display 340 may include a device that provides visual images to a user. For example, display 340 may display video information or text information to a user. Display 340 may also display graphic information regarding incoming/outgoing calls, websites, text messages, phonebooks, volume settings, etc., to a user of mobile terminal 110. Implementations of display 340 may be implemented as black and white or color displays, such as a liquid crystal display (LCD).

Microphone 350 may include a device that converts speech or other acoustic signals into electrical signals for use by mobile terminal 110. Microphone 350 may be located anywhere on mobile terminal 110 and may be configured, for example, to convert spoken words or phrases into electrical signals for use by mobile terminal 110.

FIG. 4 is a diagram of exemplary components of mobile terminal 110. As shown in FIG. 4, mobile terminal 110 may include processing logic 410, storage 420, user interface 430, communication interface 440, antenna assembly 450, and sensor module 460. Processing logic 410 may include a processor, microprocessor, an application specific integrated circuit (ASIC), field programmable gate array (FPGA), or the like. Processing logic 410 may include data structures or software programs to control operation of mobile terminal 110 and its components. Storage 420 may include a random access memory (RAM), a read only memory (ROM), and/or another type of memory to store data and instructions that may be used by processing logic 410.

User interface 430 may include mechanisms for inputting information to mobile terminal 110 and/or for outputting information from mobile terminal 110. Examples of input and output mechanisms might include a speaker (e.g., speaker 330) to receive electrical signals and output audio signals, a microphone (e.g., microphone 350) to receive audio signals and output electrical signals, control buttons and/or keys on a keypad (e.g., keypad 310, control keys 320) to permit data and control commands to be input into mobile terminal 110, and a display (e.g., display 340) to output visual information.

Communication interface 440 may include, for example, a transmitter that may convert baseband signals from processing logic 410 to radio frequency (RF) signals and/or a receiver that may convert RF signals to baseband signals. Alternatively, communication interface 440 may include a transceiver to perform functions of both a transmitter and a receiver. Communication interface 440 may connect to antenna assembly 450 for transmission and reception of the RF signals. Communication interface 440 may also be configured to receive and process GPS signals from GPS satellites 150-170, for example. Antenna assembly 250 may include one or more antennas to transmit and receive RF signals and GPS signals over the air. Antenna assembly 450 may receive RF signals from communication interface 440 and transmit them over the air and receive RF signals over the air and provide them to communication interface 440.

Sensor module 460 may contain hardware and software for receiving and processing sensor information from a number of sensors within mobile terminal 110, for example. Sensor module 460 may also contain hardware and/or software for receiving and processing GPS signals in order to calculate a position of mobile terminal 110. Sensor module 460 is shown in greater detail in FIG. 5.

As will be described in detail below, mobile terminal 110 may perform operations in response to processing logic 410 executing software instructions to display and transmit/receive linked text messages to/from a group of mobile terminals, using an application contained in a computer-readable medium, such as storage 420. A computer-readable medium may be defined as a physical or logical memory device.

The software instructions may be read into storage 420 from another computer-readable medium or from another device via communication interface 440. The software instructions contained in storage 420 may cause processing logic 410 to perform processes that will be described later. Alternatively, hardwired circuitry may be used in place of or in combination with software instructions to implement processes consistent with the embodiments. Thus, implementations consistent with the principles of the embodiments are not limited to any specific combination of hardware circuitry and software.

FIG. 5 shows a block diagram of sensor module 460. For example, sensor module 460 may include a control module 510, a motion module 520, a location module 530, a temperature module 540, a light module 550, a compass module 560, a gas module 570, a height module 580 and a pressure module 590. Each of modules 520-590 may be connected to one of sensors 501-508.

Sensors 501-508 may include electro-mechanical and/or electro-chemical devices that produce electrical signals to sense and/or indicate a value of a parameter. For example, sensor 501 may sense motion parameters, sensor 502 may sense location parameters, sensor 503 may sense temperature parameters, sensor 504 may sense light density parameters, sensor 505 may sense direction parameters, sensor 506 may sense gas density parameters, sensor 507 may sense height/altitude parameters and sensor 508 may sense pressure parameters. Sensor 501 may be any electro-mechanical device, such as a gyroscope or an accelerometer, which produces an electrical signal indicative of sensed motion parameters, such as velocity and acceleration. Sensor 503 may be any type of device used to sense temperature. Each of sensors 501-508 may be connected to a module (520-590) as described below, which may process the sensor data received from each of sensors 501-508.

Control module 510 may include hardware and/or software for receiving and transmitting sensor data, applications and rules between modules 520-590 and processing logic 410. For example, control module 510 may receive sensor data, an application and a rule from location module 530 and provide this information to processing logic 410 to be transmitted to server 180. Additionally, control module 510 may receive applications and/or information from processing logic 410 and provide the received applications and information to one of modules 520-590. For example, an application for processing light parameters (downloaded from server 180) may be received by control module 510 and provided to light module 550.

Motion module 520 may include hardware and/or software for receiving and processing sensor data received from sensor 501. For example, motion module 520 may receive electrical signals from sensor 501 that indicate the measured motion of mobile terminal 110. Motion module 520 may also include and/or store a motion application (e.g., a program) that may include rules and/or conditions that relate to motion parameters (i.e., velocity, acceleration) of the mobile terminal 110. For example, motion module 520 may compare received sensor data from sensor 501 to stored rules or condition relating to velocity. For example, motion module 520 may determine when mobile terminal 110 is moving faster than 100 km/hr, moving between 25 km/hr and 100 km/hr, etc. When motion module 520 determines that received sensor data meets or satisfies a rule and/or condition, motion module 520 may transmit information identifying the stored motion application, the (satisfied) rule and/or the sensor data to control module 510. Motion module 520 may also receive signals and information from control module 510. Additionally, motion module 520 may send a signal to control module 510 that updated sensor data indicates that a rule, that was previously satisfied, is now no longer satisfied.

Location module 530 may include hardware and/or software for receiving and processing sensor data received from sensor 502. For example, location module 530 may receive electrical signals from sensor 502 where the received signals indicate the position or location of mobile terminal 110. In other examples, sensor 502 may receive or sense signals transmitted from GPS satellites 150-170. In this example, location module 530 may use signals received from GPS satellites 150-170 to calculate the position of mobile terminal 110. Location module 530 may also include and/or store a location application (e.g. a program) that may include rules and/or conditions that relate to location parameters (i.e., longitude, latitude, coordinates) of the mobile terminal 110. For example, location module 530 may compare received sensor data from sensor 502 to stored rules or conditions relating to positions of mobile terminal 110. For example, one rule may determine if the position of mobile terminal 110 is within a mile of a specific location. When location module 530 determines that received sensor data meets or satisfies a rule and/or condition, location module 530 may transmit information identifying the stored location application, the (satisfied) rule and/or the sensor data to control module 510. Location module 530 may also receive signals and information from control module 510. Additionally, location module 530 may signal control module 510 that updated sensor data indicates that a rule, that was previously satisfied, is now no longer satisfied.

Temperature module 540 may include hardware and/or software for receiving and processing sensor data received from sensor 503. For example, temperature module 540 may receive electrical signals from sensor 503 where the received signals indicate the measured ambient temperature around mobile terminal 110. Temperature module 540 may also include and/or store a temperature application (e.g., a program) that may include rules and/or conditions that relate to temperature. For example, temperature module 540 may compare received sensor data from sensor 503 to stored rules or condition relating to temperature. For example, temperature module 540 may determine when the ambient temperature around mobile terminal 110 is greater than 25 degrees Celsius, for example. When temperature module 540 determines that received sensor data meets or satisfies a rule and/or condition, temperature module 540 may transmit information identifying the stored temperature application, the (satisfied) rule and/or the sensor data to control module 510. Temperature module 540 may also receive signals and information from control module 510. Additionally, temperature module 540 may signal control module 510 that updated sensor data indicates that a rule, that was previously satisfied, is now no longer satisfied.

Light module 550 may include hardware and/or software for receiving and processing sensor data received from sensor 504. For example, light module 550 may receive electrical signals from sensor 504 where the received signals indicate the measured ambient light around mobile terminal 110. Light module 550 may also include and/or store a light application (e.g., a program) that may include rules and/or conditions that relate to light. For example, light module 550 may compare received sensor data from sensor 504 to stored rules or condition relating to light. For example, light module 550 may determine when the amount of ambient light around mobile terminal 110 is greater than 50 lumens, for example. When light module 550 determines that received sensor data meets or satisfies a rule and/or condition, light module 550 may transmit information identifying the stored light application, the (satisfied) rule and/or the sensor data to control module 510. Light module 550 may also receive signals and information from control module 510. Additionally, light module 550 may signal control module 510 that updated sensor data indicates that a rule, that was previously satisfied, is now no longer satisfied.

Compass module 560 may include hardware and/or software for receiving and processing sensor data received from sensor 505. For example, compass module 560 may receive electrical signals from sensor 505 where the received signals indicate the directions around mobile terminal 110. Compass module 560 may also include and/or store a compass application (e.g., a program) that may include rules and/or conditions that relate to a direction of travel. For example, compass module 560 may compare received sensor data from sensor 505 to stored rules or condition relating to direction. For example, compass module 560 may determine when the direction that mobile terminal 110 is moving/traveling is North, for example. When compass module 560 determines that received sensor data meets or satisfies a rule and/or condition, compass module 560 may transmit information identifying the stored compass application, the (satisfied) rule and/or the sensor data to control module 510. Compass module 560 may also receive signals and information from control module 510. Additionally, compass module 560 may signal control module 510 that updated sensor data indicates that a rule, that was previously satisfied, is now no longer satisfied.

Gas module 570 may include hardware and/or software for receiving and processing sensor data received from sensor 506. For example, gas module 570 may receive electrical signals from sensor 506 where the received signals indicate the amount (e.g., density) of particular gas molecules around mobile terminal 110. Gas module 570 may also include and/or store a gas application (e.g., a program) that may include rules and/or conditions that relate to gas. For example, gas module 570 may compare received sensor data from sensor 506 to stored rules or condition relating to density of a particular gas. For example, gas module 570 may determine when the density of a particular gas is greater than 10 parts per million, for example. When gas module 570 determines that received sensor data meets or satisfies a rule and/or condition, gas module 570 may transmit information identifying the stored gas application, the (satisfied) rule and/or the sensor data to control module 510. Gas module 570 may also receive signals and information from control module 510. Additionally, gas module 570 may signal control module 510 that updated sensor data indicates that a rule, that was previously satisfied, is now no longer satisfied.

Height module 580 may include hardware and/or software for receiving and processing sensor data received from sensor 507. For example, height module 580 may receive electrical signals from sensor 507 where the received signals indicate the height or altitude of mobile terminal 110 with respect to, for example, sea level. Height module 580 may also include and/or store a height application (e.g., a program) that may include rules and/or conditions that relate to height. For example, height module 580 may compare received sensor data from sensor 507 to stored rules or condition relating to altitude. For example, height module 580 may determine when the altitude of mobile terminal 110 is greater than 1 mile above sea level, for example. When height module 580 determines that received sensor data meets or satisfies a rule and/or condition, height module 580 may transmit information identifying the stored height application, the (satisfied) rule and/or the sensor data to control module 510. Height module 580 may also receive signals and information from control module 510. Additionally, height module 580 may signal control module 510 that updated sensor data indicates that a rule, that was previously satisfied, is now no longer satisfied.

Pressure module 590 may include hardware and/or software for receiving and processing sensor data received from sensor 508. For example, pressure module 590 may receive electrical signals from sensor 508 where the received signals indicate the air pressure around mobile terminal 110. Pressure module 590 may also include and/or store a pressure application (e.g., a program) that may include rules and/or conditions that relate to pressure. For example, pressure module 590 may compare received sensor data from sensor 508 to stored rules or condition relating to pressure. For example, pressure module 590 may determine when the air pressure around mobile terminal 110 is greater than 1 Pascal, for example. When pressure module 590 determines that received sensor data meets or satisfies a rule and/or condition, pressure module 590 may transmit information identifying the stored pressure application, the (satisfied) rule and/or the sensor data to control module 510. Pressure module 590 may also receive signals and information from control module 510. Additionally, pressure module 590 may signal control module 510 that updated sensor data indicates that a rule, that was previously satisfied, is now no longer satisfied.

FIGS. 6A and 6B illustrate exemplary lists or tables 600-1 and 600-2 consistent with the principles of the embodiments described herein. Lists 600-1 and 600-2 may be stored on a computer-readable medium that stores information in a machine-readable format. In one implementation, exemplary lists 600-1 and 600-2 may be stored in connection module 290 of server 180. Lists 600-1 and 600-2 may include a list of mobile terminals (i.e., mobile terminals 110-130) and other information that may be arranged as individual entries (shown here as rows) that include fields (shown here in columns), such as a device ID field 610, an application field 620, a data field 630 and a rule field 640. Information in lists 600-1 and 600-2 may be arranged in any format. In the example, shown in FIG. 6A, list 600-1 may include information from mobile terminals that employ a motion application, as described above. It should be understood that additional lists 600 may be created to store information for each different type of application, as described above with reference to FIG. 5. It should also be understood that the mobile terminals identified on lists 600 may be added or deleted from lists 600 based on updated sensor data received on the mobile terminals.

Device ID field 610 may include information that identifies a specific mobile terminal. The information in device ID field 610-1 may be a number, such as 137, for example, that may identify mobile terminal 110. The information in device ID field 610-1 may also include an IP address, which may be provided by connection module 290 in server 180. In this example, information received from mobile terminals "137," "216" and "144" may be received by server 180 and stored in list 600-1.

Application field 620 may include information that identifies the application within a mobile terminal 110-130. In this example, application field 620-1 may include text information, such as "motion," where this information identifies a specific application within one of modules 520-590 a mobile terminal, for example.

Data field 630 may include sensor data that has been received from a mobile terminal, such as one of mobile terminals 110-130. In one implementation, information in data field 630-1 may be numerical information, such as "v=0," indicating that the sensed velocity is equal to zero. Data stored in data field 630 may be changed and/or updated by subsequent received inputs from mobile terminals 110-130, for example.

Rule field 640 may include a satisfied rule associated with an application, such as an application identified in application field 620. For example, the information in data field 630-1, such as "v=0," satisfies the rule "velocity is less than 1 km/hr." In this example, the rule "velocity is less than 1 km/hr," may be stored in rule field 640-1.

As shown in FIG. 6B, list 600-2 includes the same fields as described above with respect to FIG. 6A. In exemplary list 600-2, there are multiple application identifiers, data and rules stored and associated with each mobile terminal. For example, mobile terminal 110 (identified by 137 in device ID field 610-2) may have transmitted sensor data "L=(x,y)" and "V=0," (stored in data field 630-2) where this data satisfies rules "L(x,y) within 1 km of L(a,b)" and "V<1 km/hr," (stored in rules field 640-2), where the stored rules may be associated with "location" and "motion" applications (identified and optionally stored in application field 620-2) respectively. Mobile terminal 120 (identified by 216 in device ID field 610-2) may have transmitted sensor data, application information and rules similar to those transmitted by mobile terminal 110 as described above. It should be understood that additional lists 600 may be created and stored by connection module 290 that include any number of rules (e.g., two or more), applications and sensor data associated with each mobile terminal.

Figure 7:
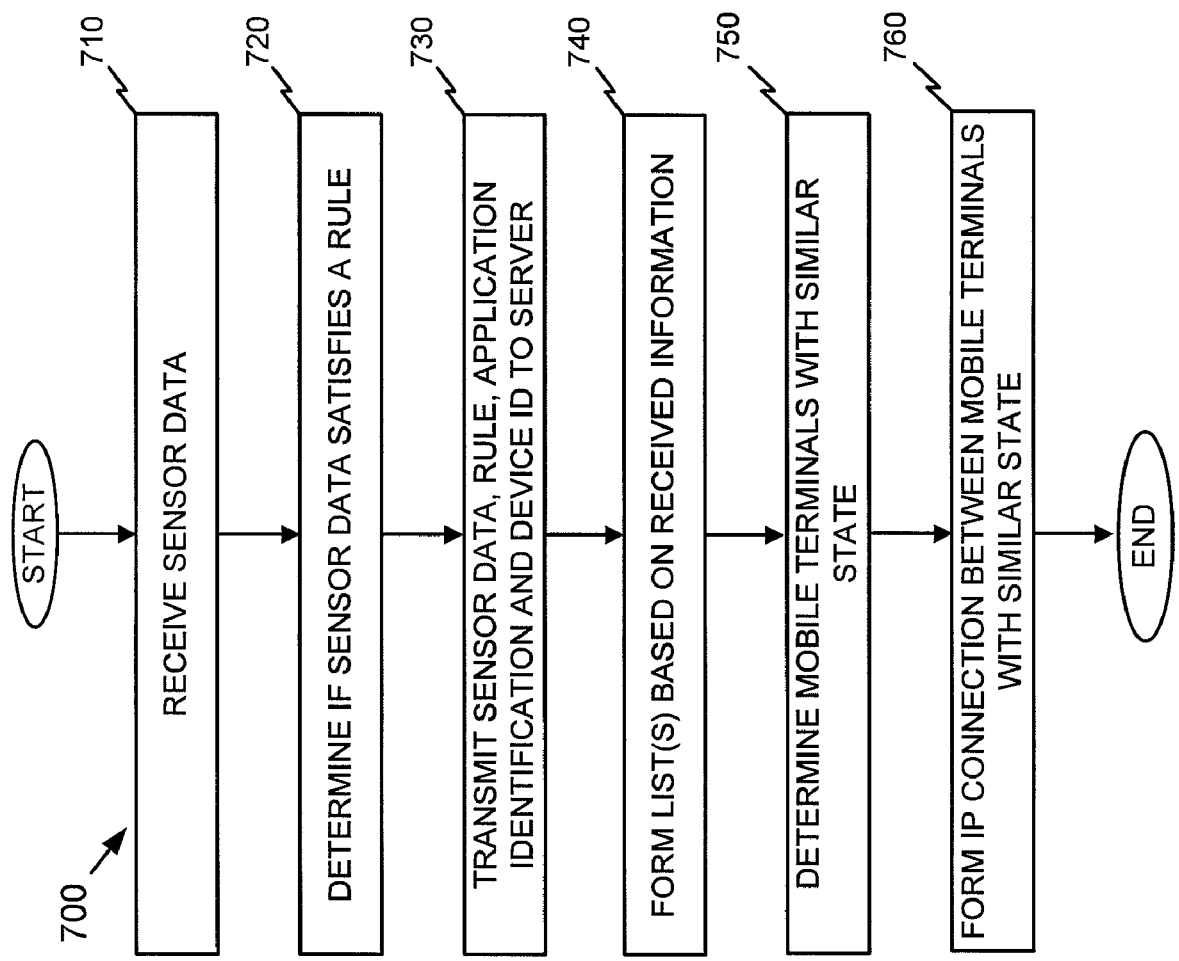
FIG. 7 is a flow diagram illustrating exemplary processing by the system.

FIG. 7 illustrates an exemplary processing 700 consistent with implementations described herein. Processing may begin, for example, by receiving sensor data (block 710). As shown in FIG. 5, each of sensors 501-508 may sense a corresponding parameter and provide this parameter to the respective module (i.e., modules 520-590) (block 710). As described above, each of modules 520-590 may compare received sensor data to rules relating to the sensed parameters. Modules 520-590 within sensor module 460 may continually receive sensor data from sensors and determine if a rule is satisfied (block 720). For example, motion module 520 may receive sensor data from sensor 501 indicating that mobile terminal 110 is not moving, i.e., velocity equals zero (block 710). If for example, motion module 520 includes rules such as "velocity is less than 1 km/hr" and "velocity is greater than 100 km/hr," the rule "velocity is less than 1 km/hr" is satisfied when the received sensor data indicates that mobile terminal 110 has a velocity of zero (block 720). When a rule within one of modules 520-590 is satisfied, the sensor data, the (satisfied) rule, information identifying the application and a device ID may be transmitted to server 180 (block 730).

Server 180 may receive the transmitted information (in block 730) and form a list (block 740). As shown in FIG. 6A for example, server 180 may store the received information in list 600-1 that identifies mobile terminals that are using a motion application, for example. For example, mobile terminal 110 may have a device ID number of 137, where this information may be stored in device ID field 610-1. The other information transmitted from mobile terminal 110 may be stored in fields 620-1 to 640-1 as shown. In this example, the application identification information stored in application field 620-1 is "motion," while the sensor data "V=0" may be stored in data field 630-1 and the rule "velocity is less than 1 km/hr" may be stored in rule field 640-1 (block 740). List 600-1 stored in server 180 may also contain information transmitted from other mobile terminals (such as mobile terminal 120). For example, mobile terminal 120 may have a device ID number of 216, where this information may be stored in device ID field 610-1. The other information transmitted from mobile terminal 120 may be stored in corresponding fields 620-1 to 640-1. Continuing with this example, the application identification information stored in application field 620-1 is "motion," while the sensor data "V=0" may be stored in data field 630-1 and the rule "velocity is less than 1 km/hr" may be stored in rule field 640-1. This information provided and transmitted from mobile terminal 120 may be obtained and transmitted by mobile terminal 120 in blocks 710-730 and may be received/stored by server 180 in block 740.

Server 180 may then determine mobile terminals in similar states (block 750). For example, using list 600-1, connection module 290 in server 180 may determine that both mobile terminals 110 and 120 are in a similar state as they are both not moving (i.e., velocity equals zero) (block 750). This may correspond to a situation where the users of mobile terminals 110 and 120 are both driving in heavy traffic. In further examples, server 180 may determine mobile terminals that are in a similar state using additional lists (block 750). As described above, lists 600 stored in server 180 may include information relating to rules associated with an application or lists 600 in server 180 may relate to rules associated with multiple applications. List 600-2 shown in FIG. 6B, contains multiple sensor data, multiple applications and multiple rules for each mobile terminal. For example, information associated with each mobile terminal (110 and 120, respectively identified in device ID field 610-2 by 137 and 216) includes both a motion and a location application (stored in application field 620-2), corresponding sensor data (stored in data field 630-2) for each application and the associated rules (stored in rules field 640-2).

Assume for example, that two people (each having one of mobile terminals 110 and 120) are driving separately to Washington D.C. along the same road. As each person travels, sensor data is constantly being received by sensor module 460 (within each mobile terminal) and compared to rules within modules 520-590. If a rule within location module 530 is satisfied, such as the position coordinates of a mobile terminal is within 1 km of the position coordinates of the destination of Washington D.C. (i.e., L(x,y) is within 1 km of L(a,b)), the information shown in list 600-2 may be transmitted to server 180. Server 180 may then determine that these mobile terminals (e.g., 110 and 120) are in a similar state (i.e., both within 1 km of Washington D.C. and both traveling less than 1 km/hr) (block 750).

Once mobile terminals 110 and 120 have been determined to be in similar states, an IP connection may be formed between these devices (block 760). For example, connection module 290 in server 180 may provide each mobile terminal with a temporary IP address, and use these temporary addresses to establish an IP connection between mobile terminals 110 and 120. An example of communicating over an established IP connection between mobile terminals 110 and 120 is shown in FIG. 8A.

FIG. 8A shows an exemplary message received and displayed via display 340, on mobile terminal 110. Mobile terminal 120 may also receive a similar message from server 180. For example, the exemplary message in FIG. 8A may contain a link "Device Connection," that when activated, allows communication between mobile terminals 110 and 120 over the established IP connection. Users of mobile terminals 110 and 120 may then highlight and select the displayed "Device Connection" link.

After establishing and activating the IP connection to mobile terminal 120, the user of mobile terminal 110 may transmit/receive a text message and/or chat with the user of mobile terminal 120. As shown in FIG. 8B for example, a user of mobile terminal 110 may query the user of mobile terminal 120 for information, such as, "Hi there, why is the traffic bad? The user of mobile terminal 120 may then respond with information identifying the cause of the traffic jam. In other examples, any number of mobile terminals may be connected via an IP connection, such as for example, via a chat room type of environment. For example, users of mobile terminals 110-130, may all be traveling in the same car (as determined by acceleration parameters), and may be connected via an IP connection.

In other examples, the IP connection formed (in block 760) may be between mobile terminal 110 and server 180. For example, temperature module 540 may include a rule of "temperature is less than zero" and when sensor data received from sensor 503 satisfies this rule, the data (as described above in blocks 710-740) may be transmitted to server 180. In this example, server 180 may create an IP connection to mobile terminal 110 and transmit an alarm indicating that the temperature is less than zero (block 760). In another example, mobile terminal 110 may transmit a code to server 180, where server 180 may interpret the code to determine a satisfied rule and associated application. In still further examples, server 180 may transmit a telephone number (of mobile terminal 120) to mobile terminal 110 via the IP connection. In this example, a user of mobile terminal 110 may then call the user of mobile terminal 120 for getting directions, etc. In this manner, IP connections may be formed between devices, where communicated information (and/or the IP connection itself) may be determined by the type of rule that is satisfied.

CONCLUSION

Implementations consistent with the systems and methods described herein allow users of mobile terminals to be connected in response to received sensor data.

The foregoing description of the embodiments provides illustration and description, but is not intended to be exhaustive or to limit implementations to the precise form disclosed. Modifications and variations are possible in light of the above teachings or may be acquired from practice of the implementations.

For example, the embodiments have been described in the context of a mobile terminals communicating over a network and employing GPS features. The embodiments may be implemented in other devices or systems and/or networks. In addition, in some embodiments, functions described above as being performed by server 180 may be performed by other devices, such as one of the mobile terminals.

Further, while series of acts have been described with respect to FIG. 7, the order of the acts may be varied in other implementations. Moreover, non-dependent acts may be performed in parallel.

It will also be apparent to one of ordinary skill in the art that aspects of the implementations, as described above, may be implemented in cellular communication devices/systems, methods, and/or computer program products. Accordingly, the implementations may be embodied in hardware and/or in software (including firmware, resident software, micro-code, etc.). Furthermore, the implementations may take the form of a computer program product on a computer-usable or computer-readable storage medium having computer-usable or computer-readable program code embodied in the medium for use by or in connection with an instruction execution system. The actual software code or specialized control hardware used to implement aspects of the embodiments is not limiting of the systems and methods described. Thus, the operation and behavior of the aspects were described without reference to the specific software code—it being understood that one of ordinary skill in the art would be able to design software and control hardware to implement the aspects based on the description herein.

Further, certain portions of the embodiments may be implemented as "logic" that performs one or more functions. This logic may include hardware, such as a processor, a microprocessor, an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the systems and methods described herein unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the systems and methods described herein are defined by the claims and their equivalents.

What is claimed is:

1. A method comprising:
   receiving, by a mobile terminal, sensor data from a plurality of sensors on the mobile terminal;
   determining, by the mobile terminal, that the received sensor data satisfies at least one rule;
   transmitting, in response to determining that the received sensor data satisfies the at least one rule, information from the mobile terminal to a network device, where the information comprises at least one of an identifier of an application, data associated with the at least one rule, or some of the received sensor data;
   receiving, by the mobile terminal, data identifying another mobile terminal, where the other mobile terminal is selected by the network device based on the transmitted information from the mobile terminal; and
   establishing a connection between the mobile terminal and the other mobile terminal based on the data received from the network device.

2. The method of claim 1, where the plurality of sensors provide signals to measure a plurality of different parameters.

3. The method of claim 2, where each of the plurality of different parameters is associated with the application and the at least one rule.

4. The method of claim 2, where the plurality of different parameters include a position parameter and a motion parameter.

5. The method of claim 4, where establishing the connection between the mobile terminal and the other mobile terminal comprises:
   establishing an Internet Protocol (IP) connection between the mobile terminal and the other mobile terminal.

6. The method of claim 1, further comprising:
   receiving, by the network device and from the other mobile terminal, additional information;
   identifying, by the network device and based on the additional information received from the other mobile terminal, that the other mobile terminal satisfies the at least one rule; and
   generating an Internet Protocol (IP)-based connection between the mobile terminal and the other mobile terminal, in response to identifying that the other mobile terminal satisfies the at least one rule.

7. The method of claim 6, further comprising:
   receiving, by the network device, information identifying each of the mobile terminal and the other mobile terminal where each of the information transmitted from the mobile terminal and the additional information received from the other mobile terminal includes application information and sensor data associated with the at least one rule.

8. The method of claim 7, further comprising:
   storing, by the network device, the received information identifying each of the mobile terminal and the other mobile terminal, the application information, and sensor data associated with the at least one rule.

9. The method of claim 8, further comprising:
   determining, based on the information received from the mobile terminal and the additional information received from the other mobile terminal, that each of the mobile terminal and the other mobile terminal satisfies at least two rules.

10. The method of claim 6, where the generating the IP-based connection between the identified mobile terminals comprises:

transmitting a link to the mobile terminal and the other mobile terminal.

11. A mobile terminal, comprising:
a plurality of sensors to receive sensor data comprising one or more measurements of a plurality of parameters;
a memory to store at least one rule associated with each of the plurality of parameters; and
a processor to:
determine when a rule, of the stored at least one rule, is satisfied by the received sensor data,
transmit, in response to determining that the received sensor data satisfies the at least one rule, information comprising at least one of an identifier of an application, data associated with the at least one rule, or some or all the received sensor data to a network device; and
receive, from the network device, data identifying another mobile terminal, where the other mobile terminal is selected by the network device based on the information transmitted from the mobile terminal; and
establishing a connection between the mobile terminal an the other mobile terminal based on the data received from the network device.

12. The mobile terminal of claim 11, where the processor is further to:
transmit, to the network device, a portion of the sensor data, where the portion of the sensor data is related to that satisfied the satisfied rule to the network device.

13. The mobile terminal of claim 12, where the memory stores applications associated with the plurality of parameters, where the processor is further to:
identify, to the network device, one of the applications associated with the satisfied rule.

14. The mobile terminal of claim 11, where the received information comprises an alert from the network device.

15. The mobile terminal of claim 11, where the received information comprises text from another mobile terminal.

16. A network device comprising:
an interface to receive sensor data and rule-related information from a plurality of mobile terminals;
a memory to store the received sensor data and rule-related information from the plurality of mobile terminals; and
a processor to:
identify, based on the received sensor data and rule-related information, mobile terminals, of the plurality of mobile terminals, that transmitted sensor data that satisfy a first rule, and
initiate an Internet Protocol (IP) connection between the identified mobile terminals.

17. The network device of claim 16, where the processor is further to:
access the memory to identify two or more of the plurality of mobile terminals that transmitted sensor data that satisfy more than one rule.

18. The network device of claim 16, where the memory stores a device identifier (ID) associated with each of the identified mobile terminals.

19. The network device of claim 18, where the memory stores application identifiers, rule-related information, and sensor data associated with each of the device IDs.

20. The network device of claim 16, where the processor is further to:
assign an IP address to each of the identified mobile terminals to generate the IP connection between the identified mobile terminals.

* * * * *